United States Patent [19]

Atkins et al.

[11] Patent Number: 4,925,886
[45] Date of Patent: May 15, 1990

[54] HIGH TEMPERATURE EPOXY TOOLING COMPOSITION OF BIFUNCTIONAL EPOXY, TRIFUNCTIONAL EPOXY, ANHYDRIDE, IMIDAZOLE AND INTERSTITIALLY MATCHED FILLER

[75] Inventors: Richard P. Atkins, Utica; Chen-Shih Wang; Thomas J. Dearlove, both of Troy, all of Mich.

[73] Assignee: General Motors Corporation, Detroit, Mich.

[21] Appl. No.: 300,401

[22] Filed: Jan. 23, 1989

[51] Int. Cl.$^5$ .................. C08G 59/38; C08G 59/42; C08G 59/68

[52] U.S. Cl. ........................... 523/443; 528/94; 528/99; 528/103

[58] Field of Search ................. 528/94, 99, 103; 523/443

[56] References Cited

U.S. PATENT DOCUMENTS

| | | | |
|---|---|---|---|
| 2,951,825 | 9/1960 | Reinking et al. | 528/98 |
| 3,329,652 | 7/1967 | Christie | 528/94 |
| 3,394,105 | 7/1968 | Christie | 528/94 |
| 3,507,831 | 4/1970 | Avis et al. | 528/94 |
| 3,658,750 | 4/1972 | Tsukui et al. | 523/220 |
| 3,746,686 | 7/1973 | Marshall et al. | 528/104 |
| 3,756,984 | 9/1973 | Klaren et al. | 528/94 |
| 3,859,379 | 1/1975 | Kitamura et al. | 525/486 |
| 4,002,599 | 1/1977 | Graham | 528/99 |
| 4,346,207 | 8/1982 | Maurer et al. | 528/103 |
| 4,423,094 | 12/1983 | Dearlove et al. | 427/386 |
| 4,732,962 | 3/1988 | Atkins et al. | 528/94 |

OTHER PUBLICATIONS

Data Sheet by Shell Chemical Company, entitled "Epon ® Resins for Casting", p. 69, published Jan., 1967.

Primary Examiner—John Kight, III
Assistant Examiner—Frederick Krass
Attorney, Agent, or Firm—Randy W. Tung

[57] ABSTRACT

A tough, durable, high temperature epoxy tooling composition for making cast-to-size forming tools. The composition comprises a bisphenol-A epoxy, a trifunctional aromatic epoxy, an anhydride catalyst, and an imidazole catalyst. The composition may optionally contain a filler system comprising filler particles having different diameters that are interstitially-matched.

5 Claims, No Drawings

HIGH TEMPERATURE EPOXY TOOLING COMPOSITION OF BIFUNCTIONAL EPOXY, TRIFUNCTIONAL EPOXY, ANHYDRIDE, IMIDAZOLE AND INTERSTITIALLY MATCHED FILLER

FIELD OF THE INVENTION

The present invention generally relates to a high temperature epoxy tooling composition for cast-to-size tools used in injection molding and sheet molding compound (SMC) molding of plastic materials, more particularly, it is concerned with a tough, high temperature epoxy tooling composition for making cast-to-size tools for use in injection molding and SMC molding at mold temperatures up to 200° C.

BACKGROUND OF THE INVENTION

Injection molding tools and SMC molding tools traditionally have been made of high strength tool steel because of its rigidity and durability. In the automotive industry, molds made of tool steel have been used to injection or compression mold automobile parts made of either thermoplastic or thermoset plastic materials. However, these steel molds are very costly due to the extensive machining required to make them.

It is a common practice in the automotive industry that before a new car is put into production, a limited number of concept or prototype cars are first built for testing. Designing forming tools with tool steel for molding plastic parts used in these prototype cars would not be practical for several reasons. First, a prototype car has to be built in a relatively short time which prohibits the use of tool steel for forming tools due to the extensive machining required. Secondly, the design of a prototype car is changed many times from the original design before it reaches a final production model. This means that many forming tools will have to be built before the design of a specific part is finalized. This makes the building of a steel forming tool prohibitive for cost reasons.

To remedy these problems, castable polymeric materials have been used to make prototype sheet metal stamping tools in recent years. One of these materials is epoxy. For instance, U.S. Pat. No. 4,423,094 to Dearlove et al and assigned to General Motors Corporation discloses a tough, durable epoxy novolac material for use in making sheet metal stamping dies. While this material exhibits good mechanical strength for tooling purposes, it can be used at mold temperatures of up to 150° C. only. This limits its use to sheet metal stamping tools. In most injection molding and SMC molding tools, the tooling material for the mold should remain stable at temperatures higher than 150° C. Another drawback of the Dearlove et al epoxy tooling composition is the high cost of the epoxy novolac resin.

It is therefore an object of the present invention to provide an epoxy tooling composition that can be used in injection molding or SMC molding tools at mold temperatures higher than 150° C.

It is another object of the present invention to provide an epoxy tooling composition that can be used in a cast-to-size injection molding or SMC molding tool at mold temperatures higher than 150° C.

It is yet another object of the present invention to provide an epoxy tooling composition of high compressive strength that can be used in a cast-to-size injection molding or SMC molding tool at mold temperatures higher than 150° C.

SUMMARY OF THE INVENTION

In accordance with a preferred practice of our invention, novel epoxy tooling compositions that can be used in casting high temperature injection molding or SMC molding tools are provided. The epoxy tools cast from this composition can be used at molding temperatures higher than 150° C. Based on measured heat deflection temperatures of 182°–186° C., we recommend a maximum use temperature of 200° C. for a molding tool cast from our composition. The viscosity of our epoxy tooling composition is sufficiently low such that even at filler loadings as high as 75 volume percent, it can still be poured into a mold having thin sections and bulk sections. The term "bulk section" in an epoxy tool is defined as a section having a thickness of much larger than ¼ inch. The term "thin section" is defined as a section having a thickness of less than ¼ inch.

We have previously discovered that in order to cast a bulk section tool, the reaction exothermic heat given out by the epoxy during curing must be controlled. Since the amount of exothermic heat per unit weight of epoxy is fixed, we have devised a unique casting method to avoid any potential over-heating problem. First, to minimize the total amount of exothermic heat produced by the epoxy curing reaction, we use the least amount of epoxy by utilizing a system of interstitially-matched fillers. Other workers have attempted to use large amounts of fillers in rapid cure epoxy systems without success. This is because that when filler loadings above a critical level are added to an epoxy casting composition, the viscosity of the composition increases to such an extent that it is no longer pourable.

We have discovered that by interstitially matching the particle size of the fillers, the viscosity of the filled epoxy composition can be maintained at constant level even at very high filler loadings. By interstitially matching the fillers, we carefully select filler particles of different sizes such that smaller particles would fit in the interstices between larger particles. When this critical requirement is met, a total filler loading as high as 75 volume percent may be used while the pourability of the epoxy composition is maintained.

Another benefit of using high loadings of fillers is that the fillers serve as a heat buffer absorbing the exothermic heat evolved from the curing reaction. As a result, potential formations of thermal shocks or localized heat pockets which may lead to excessive shrinkage or deformation in the tool are avoided.

Our novel epoxy composition comprises a bisphenol-A type epoxy resin, a trifunctional aromatic epoxy resin, an anhydride curing agent, an imidazole catalyst, and optionally an interstitially-matched filler system. We have found that the exact combination of our unique composition of the two epoxy resins, the anhydride curing agent, and an imidazole catalyst is critically important. Replacing any one component with another ingredient would result in a severe loss of physical properties such as the heat deflection temperature and the tensile properties. Three interstitially-matched fillers were used in our preferred embodiments. When used in an amount as high as 75 volume percent of the total composition, the exothermic heat evolved from the curing reaction of the composition is significantly reduced. Our novel epoxy tooling composition can be cured in two steps. The first step of pre-cure can be carried out either at room temperature for 2 days or at 60° C. for 8 hours. After the pre-cure, the mold making frames are removed and the tool is then postcured at 180° C. for 2 hours.

Other objects, features and advantages of the present invention will become apparent upon consideration of the specification that follows.

DESCRIPTION OF THE PREFERRED EMBODIMENTS

The concept of using an interstitially-matched filler system in which the smaller particulate fillers fit in the interstitial spacings between the larger and medium size particulate fillers was first proven by us by using a commercial epoxy system. This commercial epoxy system Magnolia 6013A was obtained from the Magnolia Plastics Company. It contains 27 volume percent iron particles of 20 micron size. To test our interstitially-matched filler system, we first added a second filler of iron particles having 125 micron size to observe the effect of this second filler on the viscosity. A drastic increase in viscosity from $70 \times 10^3$ centipoise at 27 volume percent iron particle loading to $470 \times 10^3$ centipoise at 33 volume percent iron particle loading was observed, i.e., a seven-fold increase in viscosity caused by an 8 volume percent increase in the iron powder loading. Our experience indicated that when a viscosity of greater than $150 \times 10^3$ centipoise is reached, the fluidity of the casting composition is reduced to such an extent that the composition becomes virtually unpourable.

We next tried our interstitially-matched filler system by using an iron particle having particle size of 279 microns. By gradually increasing the total iron powder loading to 40 volume percent, the viscosity of the system is increased from $70 \times 10^3$ to only $100 \times 10^3$ centipoise. At $100 \times 10^3$ centipoise viscosity, the casting composition can be poured into thin mold sections with no flow problem.

Compounding for our novel composition was carried out in a Ross mixer. The first epoxy resin used in our composition is a diglycidyl ether of bisphenol-A supplied by the Hi-Tek Polymers, Inc. under the trade name of Epi-Rez ® 509. This epoxy resin has an approximate epoxy equivalent weight between 177 to 190 and a viscosity at 25° C. in the range of 7000 to 10000 centipoise. Other commercial products that are substantially equal to this epoxy resin are Dow Chemical D.E.R. ® 330, Shell Epon ® 826, and Ciba-Geigy Araldite ® 6005.

The second epoxy resin used in our composition is a trifunctional aromatic epoxy of triglycidyl p-aminophenol supplied by the Ciba-Geigy Co. under the tradename of Araldite ® 0510. This epoxy resin has an approximate epoxy equivalent weight of about 95 to 107 and a viscosity at 25° C. in the range of about 550 to 850 centipoise. Another commercial product which we have found that works equally well is Tactix ® 742 supplied by the Dow Chemical Company.

Our novel composition can be pre-cured at room temperature in approximately 2 days or at 60° C. in approximately 8 hours. This pre-cure step allows the mold frame to be made of conventional materials such as wood, plaster, and clay by a conventional frame making technique. After this initial cure, the frame is taken apart and the wood, plaster, or clay removed. The mold is then postcured at 180° C. for 2 hours, with essentially no dimensional change.

To accomplish this two stage curing process, we have used an anhydride curing agent and three imidazole accelerators. The anhydride we have used is nadic methyl anhydride supplied by the Ciba-Geigy Co. under the designation of hardener 906. It has a viscosity at 25° C. of 175 to 275 centipoise, an anhydride content of 93% and a boiling point of 278° C. Nadic methyl anhydride is also supplied by the Buffalo Color Corporation.

The imidazole accelerators, 1,2-Dimethylimidazole and 1-Methylimidazole are both commercial products of the BASF Corporation. 1,2-Dimethylimidazole is supplied in a crystal form and can be melted into liquid at 35°–38° C. for the purpose of compounding. The other accelerator, 2-Ethyl-4-Methylimidazole, was obtained from the Fike Chemical Co.

Formulations and physical properties of the three epoxy compositions are shown in Table I.

TABLE 1

| Component | Formulation (Parts By Weight) | | |
|---|---|---|---|
| | 1 | 2 | 3 |
| Epi-Rez ® 509 | 100 | 100 | 100 |
| Araldite ® 0510 | 25 | 25 | 25 |
| Nadic Methyl Anhydride | 112 | 112 | 112 |
| 1,2-Dimethylimidazole | 3.1 | — | — |
| 2-Ethyl-4-Methylimidazole | — | 3.9 | — |
| 1-Methylimidazole | — | — | 2.85 |
| Tens. Strength (MPa) | 81.2 | 68.0 | 85.6 |
| HDT (°C.) | 181 | 181 | 186 |

The physical properties of the three epoxy compositions were determined by following standard ASTM test procedures. For instance, the heat deflection temperature (HDT) was determined by ASTM D-648 at 264 psi. The tensile strength (Tens. Strength) was determined by ASTM D-638. The compressive strength (Comp. Strength) was determined by ASTM D-695.

The amounts of the ingredients used in Compositions 1, 2 and 3 can be varied in the ranges of 20–30 parts for Araldite ® 0510, 110–115 parts for nadic methyl anhydride, and 2–6 parts for the imidazoles. The multifunctional epoxy 0510 can be replaced with a new material, Dow's Tactix ® 742. The Epi-Rez ® 509 may be replaced with other epoxies of similar molecular weight such as Dow D.E.R. ® 330 or Ciba-Geigy Araldite ® 6005.

The interstitially-matched filler system used in our novel epoxy composition comprises two silicon carbide particles and one silica particle. The parts by weight of each filler used is shown in Table II.

TABLE II

| Filler | | Parts By Weight |
|---|---|---|
| Silicon Carbide | (100 Mesh) | 400 |
| Silicon Carbide | (400 Mesh) | 150 |
| Silica (Si-21) | | 120 |

The silicon carbide particles were selected for their superior abrasion resistance resulting in a forming tool having superior durability. The silica particle was selected for its rigidity and low cost. Two different sized particles of silicon carbide were used. They were obtained from the Sohio Company. Silicon carbide SiC 100 has particle sizes in the range between 63 to 203 microns with an average particle size of 122 microns. SiC 400 has particle sizes in the range between 1 to 25 microns with an average particle size of 4 microns. A fine particle size silica Si-21 commercially available from Whittaker, Clark & Daniels Inc. was selected to fit in between the larger SiC particles. Si-21 has a particle size distribution of 51% <5 microns, 90% <15 microns and an average particle size of 2 microns.

The resin-filler compositions yielded the following properties:

TABLE III

| Physical Properties | Formulation | | |
|---|---|---|---|
| | 1/F | 2/F | 3/F |
| Tens. Strength (MPa) | 55.8 | 48.6 | 43.9 |
| Comp. Strength (MPa) | 198 | 182 | 197 |
| HDT (°C.) | 182 | 183 | 186 |

It is seen in Table III that these formulations all have a tensile strength higher than 40 MPa and a HDT higher than 180° C.

To compound our novel epoxy formulation, suitable amounts of epoxies, curing agent and catalyst are weighed and poured into a stainless steel bowl in a Ross mixer. The particulate fillers are then added to the stainless steel bowl. The total ingredients are mixed by a motor driven mixing blade under 30 inches of vacuum for 1 hour. The vacuum was applied to degas any air bubbles generated during the mixing process. The mixed epoxy formulation has a shelf life of approximately 2 days.

The procedure for casting a plastic forming tool used in a sheet metal stamping process is adequately described in U.S. Pat. No. 4,601,867 issued July 22, 1986. When casting a large size forming tool, other physical reinforcement such as a steel wire mesh may also be used to improve the structural integrity of the mold.

Our novel high temperature epoxy casting composition can be pre-cured either at room temperature for 2 days or at 60° C. for 8 hours, then postcured at 180° C. for 2 hours. When filled to a level of up to 75 volume percent filler content, it can be used at mold temperatures as high as 200° C. This is a significant improvement over the commercially available epoxy tooling compounds which are recommended for a maximum use temperature of 150° C. only. Our novel composition does not contain aromatic amines, which are generally considered to be a toxicological hazard. Furthermore, our interstitially-matched filler system enables the use of very high loadings of fillers while maintaining the fluidity of the filled composition.

While our invention has been described in terms of three specific embodiments thereof, other forms could be readily adopted by one skilled in the art to achieve the same results. For instance, any combination of other suitable filler particles having suitable particle sizes may be combined to form our interstitially-matched filler system. The only critical requirement to be met is that they must be interstitially-matched such that even when used at a high volume percent they do not significantly increase the viscosity of the total blended epoxy system. Other filler particles having good rigidity and abrasion resistance such as silica, alumina and aluminum may suitably be used in place of silicon carbide.

The embodiments of the invention in which an exclusive property or privilege is claimed are defined as follows:

1. A tough, high temperature epoxy tooling composition for use in cast-to-size forming tools comprising a bisphenol-A epoxy, a trifunctional aromatic epoxy, an anhydride curing agent, a catalyst selected from the group consisting of 1,2-dimethylimidazole, 2-ethyl-4-methylimidazole, and 1-methylimidazole, and an interstitially-matched filler system of rigid particulate fillers having different particle sizes in the range between 0.5 to 200 microns, said filled epoxy tooling composition having a usable temperature of at least 160° C. and a tensile strength of at least 40 MFa when cured.

2. A tough, durable, high temperature epoxy tooling composition for use in cast-to-size forming tools comprising 100 parts by weight of a bisphenol-A epoxy, 20 to 30 parts by weight of a trifunctional aromatic epoxy, 100 to 115 parts by weight of an anhydride curing agent, 2 to 6 parts by weight of a catalyst selected from the group consisting of 1,2-dimethylimidazole, 2-ethyl-4-methylimidazole, and 1-methylimidazole, and up to about 670 parts by weight of an interstitially-matched filler system, said filled epoxy tooling composition having a usable temperature of at least 160° C. and a tensile strength of at least 40 MPa when cured.

3. A tough, durable, high temperature epoxy tooling composition for use in cast-to-size forming tools comprising 100 parts by weight of a diglycidyl ether of bisphenol-A, 20 to 30 parts by weight of triglycidyl p-aminophenol, 100 to 115 parts by weight of nadic methyl anhydride, 2 to 6 parts by weight of a catalyst selected from the group consisting of 1,2-dimethylimidazole, 2-ethyl-4-methylimidazole, and 1-methylimidazole and, an interstitially-matched filler system, said filled epoxy tooling composition having a usable temperature of at least 160° C. and a tensile strength of at least 40 mPa when cured.

4. A tough, durable, high temperature cast-to-size epoxy tooling composition comprising 100 parts by weight of a bisphenol-A epoxy resin, 20 to 30 parts by weight of a trifunctional aromatic epoxy, 100 to 115 parts by weight of an anhydride curing agent, 2 to 6 parts of a catalyst selected from the group consisting of 1,2-dimethylimidazole, 2-ethyl-4-methylimidazole, and 1-methylimidazole, about 400 parts by weight of silicon carbide particles having particle sizes in the range between 60 and 200 microns, about 150 parts by weight of silicon carbide particles having particle sizes in the range between 1 to 25 microns, and about 120 parts by weight of silica particles having particle sizes in the range between 1 to 15 microns, said filled epoxy tooling composition having a usable temperature of at least 160° C. and a tensile strength of at least 40 MPa when cured.

5. A tough, durable, high temperature cast-to-size epoxy tool which is a reaction product of 100 parts by weight of a bisphenol-A epoxy resin, 20 to 30 parts by weight of a trifunctional aromatic epoxy, 100 to 115 parts by weight of an anhydride curing agent, 2 to 6 parts by weight of a catalyst selected from the group consisting of 1,2-dimethylimidazole, 2-ethyl-4-methylimidazole, and 1-methylimidazole, said epoxy tool containing a filler system designed with filler particles having diameters that are interstitially-matched such that a maximum amount of fillers may be used without sacrificing the pourability of the epoxy resin, said filled epoxy tool having a usable temperature of at least 160° C. and a tensile strength of at least 40 MPa.

* * * * *